(12) United States Patent
Schmidt et al.

(10) Patent No.: US 12,128,718 B2
(45) Date of Patent: Oct. 29, 2024

(54) CONSTRUCTION OF A MOLDED BODY FOR NON-PNEUMATIC TIRES

(71) Applicant: BASF SE, Ludwigshafen am Rhein (DE)

(72) Inventors: Lisa Marie Schmidt, Lemfoerde (DE);
Elmar Poeselt, Lemfoerde (DE);
Theresa Huelsmann, Lemfoerde (DE);
Florian Tobias Rapp, Ludwigshafen (DE); Frank Thielbeer, Lemfoerde (DE); Eva Anna Haase, Lemfoerde (DE); Peter Gutmann, Ludwigshafen (DE)

(73) Assignee: BASF SE, Ludwigshafen am Rhein (DE)

( * ) Notice: Subject to any disclaimer, the term of this patent is extended or adjusted under 35 U.S.C. 154(b) by 0 days.

(21) Appl. No.: 18/263,314

(22) PCT Filed: Jan. 26, 2022

(86) PCT No.: PCT/EP2022/051690
§ 371 (c)(1),
(2) Date: Jul. 27, 2023

(87) PCT Pub. No.: WO2022/161978
PCT Pub. Date: Aug. 4, 2022

(65) Prior Publication Data
US 2024/0075771 A1 Mar. 7, 2024

(30) Foreign Application Priority Data
Jan. 29, 2021 (EP) .................................. 21154315

(51) Int. Cl.
*B29D 30/04* (2006.01)
*B60C 7/10* (2006.01)

(52) U.S. Cl.
CPC .............. *B60C 7/105* (2013.01); *B29D 30/04* (2013.01)

(58) Field of Classification Search
CPC .............................. B60C 7/105; B29D 30/04
See application file for complete search history.

(56) References Cited

U.S. PATENT DOCUMENTS

| | | |
|---|---|---|
| 2007/0056670 A1 | 3/2007 | Sandstrom et al. |
| 2017/0297375 A1 | 10/2017 | Peterman |
| 2018/0155539 A1 | 6/2018 | Delaunay et al. |

FOREIGN PATENT DOCUMENTS

| | | |
|---|---|---|
| CN | 1651271 | 8/2005 |
| WO | WO-2017/039451 A1 | 3/2017 |
| WO | WO-2018/004344 A1 | 1/2018 |

(Continued)

OTHER PUBLICATIONS

International Search Report issued May 20, 2022, in PCT/EP2022/051690, 3 pages.

(Continued)

*Primary Examiner* — Jacob T Minskey
*Assistant Examiner* — Adrien J Bernard
(74) *Attorney, Agent, or Firm* — Grüneberg and Myers PLLC (57) ABSTRACT

A molded body is useful in non-pneumatic tires. The non-pneumatic tires containing the molded body are useful for vehicle wheels such as wheels for cars, bikes, motorcycles, trucks, e-scooters, toys, sports equipment, golf caddy, strollers, or wheelchairs. A process for manufacturing the molded body for non-pneumatic tires is also provided.

11 Claims, 1 Drawing Sheet

(56) References Cited

FOREIGN PATENT DOCUMENTS

WO  WO-2019/134925 A1   7/2019
WO  WO-2019/185687 A1   10/2019

OTHER PUBLICATIONS

International Preliminary Report on Patentability dated Mar. 22, 2023, in PCT/EP2022/051690, 12 pages.
Written Opinion issued May 20, 2022, in PCT/EP2022/051690, 7 pages.
European Search Report for EP Patent Application No. 21154315.2, Issued on Aug. 2, 2021, 3 pages.

CONSTRUCTION OF A MOLDED BODY FOR NON-PNEUMATIC TIRES

CROSS-REFERENCE TO RELATED APPLICATIONS

This application is the National Stage entry under § 371 of International Application No. PCT/EP2022/051690, filed on Jan. 26, 2022, and which claims the benefit of priority to European Patent Application No. 21154315.2, filed on Jan. 29, 2021. The content of each of these applications is hereby incorporated by reference in its entirety.

FIELD OF THE INVENTION

The present invention relates to a molded body for non-pneumatic tire, a process for manufacturing a molded body for non-pneumatic tires, the use of a molded body for non-pneumatic tires, non-pneumatic tires comprising a molded body and use of non-pneumatic tires for vehicle wheels such as wheels for cars, bikes, motorcycles, trucks, e-scooter, toys, sport equipment, golf caddy, stroller, wheelchairs.

BACKGROUND OF THE INVENTION

Pneumatic tires have been widely used in bicycles, cars, trucks, airplanes, etc. For these applications, comfort and reliability of the tire quality are important criteria. Pneumatic tires are sensitive to cracks, puncture, and/or other damages which can lead to a leak in the tire. Sudden tire leaks are also a safety problem. To overcome such problems, non-pneumatic tires appeared, which do not suffer from leaks. A variety of non-pneumatic tires have been developed.

WO 2019/185687 A1 discloses a non-pneumatic tire comprising a polyurethane matrix and expanded thermoplastic elastomer particles, wherein said non-pneumatic tire comprises 60 to 90 wt % of a polyurethane matrix and 10 to 40 wt % of expanded thermoplastic elastomer particles. However, the tires often show insufficient comfort in comparison to pneumatic tires, have a higher rolling resistance in comparison to pneumatic tires and have a significant higher density as a semi-compact material.

WO2017/039451 A1 and WO2018/004344 A1 disclose non-pneumatic tires and vehicle wheel assemblies, which comprise a wheel rim having two opposed circular rim flanges; an outer tire having two beads secured at the circular rim flanges; an inlay; a non-pneumatic inner tire comprising expanded thermoplastic polyurethane (E-TPU), which inner tire is enclosed by the outer tire, the inlay and the wheel rim. The tires disclosed in WO2017/039451 A1 and WO2018/004344 A1 show sufficient comfort in comparison to pneumatic tires but have a higher rolling resistance in comparison to pneumatic tires.

WO2019/134925 A1 discloses a polyurethane composite layer which comprises a polyurethane matrix material and a thermoplastic expandable polymer material dispersed in the polyurethane matrix material. The non-pneumatic tire in WO2019/134925 A1 shows high resistance, reduced weight and hydrolysis resistance. Still non-pneumatic tires which are filled with a molded body of a polymeric foam material show higher density than pneumatic tires. Furthermore, heat is generated during operation and results in shortening the lifetime of the non-pneumatic tire.

When using particle foams as material of an insert (molded body) for non-pneumatic tires, the extend of energy input and heat dissipation during use is usually influenced by the hardness of a foam material, forming the molded body within an outer tire. For non-pneumatic tires it is desirable to use softer material with lower compression strength to ensure sufficient comfort feeling. Softer material, with high rebound, however, leads to heat generation during operation due to higher rolling resistance. Harder foam material with reduced rolling resistance and reduced heat generation, however, leads to a lower comfort and reduced rebound. Furthermore, rebound of non-pneumatic tires should be at least comparable with pneumatic tires.

It was therefore an object of the present invention to provide a molded body to overcome the disadvantages of the non-pneumatic tires resulting in improved comfort properties, reduced rolling resistance, less energy input/heat generation during operation and improved stability.

SUMMARY OF THE INVENTION

The problem is solved by the features of the independent claims. Preferred embodiments of the present invention are provided by the dependent claims.

The invention therefore relates to a molded body as insert for non-pneumatic tires comprising the elements of
(A) a tube, which comprises a hollow cavity, and
(B) at least one peripheral foam layer, which comprises a polymeric foam,
wherein the elements A and B are composed.

In a preferred embodiment the material of the tube is selected from the group consisting of thermoplastic elastomers, rubber, cast elastomers, duroplastic materials, polypropylene, polyethylene terephthalate, polyamides, polyethylene, polyoxymethylene, polycarbonate and semi-aromatic polyesters in particular products such as ecovio and ecoflex (BASF SE).

In a preferred embodiment the material of the tube has a glass transition temperature in the range of from equal or below 0° C. determined by dynamic mechanical thermal analysis determined by loss factor (tan δ) according to DIN EN ISO 6721-2011-08 at a heating rate of 2 K/min at a frequency of 1 Hz.

In a preferred embodiment the tube comprises openings.

In a preferred embodiment the cavity of the tube has a diameter in the range of 5 to 90% of the diameter of the non-pneumatic tire.

In a preferred embodiment the diameter of a non-pneumatic tire is defined by the maximum distance from tread to opposing tread running through the rotational axis of such non-pneumatic tire, wherein the diameter of the tube is in the range of 5 to 90% of a section height of the non-pneumatic tire where the tube is located inside the non-pneumatic tire cavity between the tread portion and the rim.

In a preferred embodiment the cavity of the tube comprises rods for stabilizing the tube.

In a preferred embodiment the tube comprises holding pins to fix the tube within a mold and the tube comprising holding pins is manufactured by 3D printing or injection molding.

In a preferred embodiment the tube comprises holding pins to fix the tube within a mold.

In a preferred embodiment the tube comprising holding pins to fix the tube within a mold is manufactured by 3D printing or injection molding.

In a preferred embodiment the polymeric foam is selected from the group of foams consisting of thermoplastic polymer, thermoplastic elastomer, polyurethane, polyamide, polyolefin, polyethylene, polypropylene, polystyrene and mixtures thereof.

In a preferred embodiment the element (A) and/or element (B) is a thermoplastic elastomer and is selected from the group consisting of thermoplastic polyurethanes (TPU), thermoplastic polyamides (TPA) and thermoplastic polyetheresters (TPC), thermoplastic polyesteresters (TPC), thermoplastic vulcanizates (TPV), thermoplastic polyolefins (TPO), thermoplastic styrenic elastomers (TPS) and mixtures thereof.

In a preferred embodiment the peripheral foam layer comprises foamed granules.

In a preferred embodiment the polymeric foam layer is a matrix in which the foamed granules are at least partly embedded.

A further aspect of the invention relates to a process for the manufacturing of a molded body as insert for non-pneumatic tires comprising the steps of
  (i) providing the tube, which comprises the holding pins to fix the tube within a mold and which is manufactured by 3D printing or injection molding,
  (ii) providing at least one peripheral foam layer,
  (iii) composing the elements of step (i) and step (ii).

In a preferred embodiment the method in step (iii) is selected from the group consisting of steam chest molding, radio frequency (RF) molding, thermal molding, molding with pressure and combinations thereof.

A further aspect of the invention relates to a molded body obtained or obtainable by the process according to the present invention.

A further aspect of the invention relates to the use of a molded body according to the present invention for producing non-pneumatic tires.

A further aspect of the invention relates to non-pneumatic tires comprising the molded body according to the present invention, wherein the molded body is surrounded at least partwise by an outer tire and wherein the outer tire and the molded body are fused, glued or pressed together.

In a preferred embodiment the non-pneumatic tire is mounted on a rim and comprises a piezo element.

A further aspect of the invention relates to the use of non-pneumatic tires according to the present invention for vehicle wheels for industrial applications, sport applications, transportation applications, leisure activities, cars, bikes, motorcycles, trucks, e-scooter, toys, sport equipment, golf caddy, stroller or wheelchairs.

DETAILED DESCRIPTION OF THE INVENTION

With regards to the invention, the following can be stated specifically:

According to the present invention, the object is solved by a molded body as insert for non-pneumatic tires comprising the elements of
  (A) a tube, which comprises a hollow cavity, and
  (B) at least one peripheral foam layer, which comprises a polymeric foam, wherein the elements A and B are composed.

Surprisingly, it was found that with providing a molded body, which comprises the tube with a hollow cavity and at least one peripheral foam layer, and wherein both elements A and B are composed together to a composite material for the molded body, the rolling resistance is reduced, which leads to less heat generation. The hollow tube structure also leads to less heat generation. This is an improvement regarding long-term stability of the material, because material degradation is reduced. During operation of a non-pneumatic tire, due to the molded body as insert, the rebound and comfort remains while hardness can be adjusted. Furthermore, the combination of tube and peripheral foam layer enables a dedicated adjustment of hardness and rebound of the molded body according to the requirements for a particular application. For example, a combination of a hard tube structure with soft foam beads within the peripheral layer is possible to fulfill both, sufficient hardness in order to reduce the rolling resistance of the non-pneumatic tire and increase of rebound to ensure comfort requirement of the non-pneumatic tire.

A further advantage of the molded body as insert for tires is that the molded body comprises a tight foam layer as element (B). Due to the tight foam layer, which prevents evaporation of air from the hollow cavity (surrounded by the foam layer) to the outside of the molded body, the pressure within the hollow cavity can be adjusted and with that the hardness of the tire.

For the manufacturing of the foam layer preferably comprising foam beads which are fused together, it is referred to the application with the application number PCT/EP2021/075077. This application is hereby incorporated by reference and the described manufacturing in the examples of PCT/EP2021/075077 can be applied in the context of the present invention for the manufacturing of the foam layer, preferably comprising foam beads.

Preferably the foam beads have a size in the range from 1 mm to 6 mm, preferably in the range from 2 mm to 5 mm. It is further preferred that the thickness of the foam layer of element (B) is 1.5-fold the diameter of the foam beads, more preferably 2-fold the diameter of the foam beads. In particular, the thickness of the foam layer is equal or above 1.5 mm, preferably equal or above 2 mm. More preferably, the foam layer has a thickness in the range from 2 to 12 mm and even more preferably a thickness in the range from 3 to 10 mm.

Preferably, element A and element B are glued or fused together.

Preferably, the tube comprises openings. It is preferred that the openings are smaller than the particle beads which can build the peripheral foam layer. The cavity of the tube for example has a diameter in the range of 5 to 90% of the diameter of the non-pneumatic tire. Further preferred is that the cavity of the tube comprises rods or lattices (grids) for stabilizing the tube. Also preferred is that the tube comprises holding pins and the tube comprising holding pins is manufactured by 3D printing or injection molding.

Preferably, the material of the tube is selected from the group consisting of thermoplastic elastomers, rubber and cast elastomers. The polymer may also be selected form the group consisting of silicone rubber, polytetrafluoroethylene rubber, chloroprene rubber. Preferred are also duroplastic materials. Further preferred are polymers like for example polypropylene, polyethylene terephthalate, polyamides, polyethylene, polyoxymethylene, semi-aromatic polyesters in particular products such as ecovio and ecoflex (BASF SE), polycarbonate.

It is preferred that the polymeric foam of the peripheral foam layer comprises a thermoplastic polymer. The foam is for example a particle foam or a non-particular foam. Foams, especially particle foams, have long been known and have been widely described in the literature, e.g. in Ullmann's "Encyclopedia of Technical Chemistry", 4th edition, volume 20, p. 416 ff.

Highly elastic, largely closed-cell foams, such as particle foams made of thermoplastic elastomers, which e.g. produced in an autoclave or by the extruder process show special dynamic properties and in some cases also good rebound resilience. Hybrid foams made from particles of thermoplastic elastomers and system foam or binders are also known. Depending on the foam density, the manufacturing method and the matrix material, a relatively broad level of rigidity can be adjusted. The properties of the foam can also be influenced by post-treatment of the foam, such as tempering.

Foamed pellets, which are also referred to as particle foams (or bead foams, particle foam), and molded articles made therefrom, based on thermoplastic polyurethane or other elastomers, are known (for example WO 94/20568A1, WO 2007/082838 A1, WO2017/030835 A1, WO 2013/153190 A1, WO2010/010010 A1) and can be used in many different ways.

A foamed pellet or also a particle foam or bead foam in the sense of the present invention refers to a foam in the form of a particle, the average length of the particles preferably being in the range of from 1 to 8 mm. In the case of non-spherical, e.g. elongated or cylindrical particles mean the longest dimension by length.

Thermoplastic polymers in the context of the present invention, in particular the foams of the molded body, include amorphous or semi-crystalline rigid or elastomeric thermoplastics, such as styrene polymers (PS), polyester (PE), polyolefins (PO), polyamides (PA) or thermoplastic polyurethanes (TPU). Preferably polypropylene (PP), polyamide (PA), polyether block amide (PEBA), styrene polymers, polylactic acid (PLA) and biodegradable, aliphatic-aromatic polyesters or mixtures thereof, polyvinyl alcohol (PVOH) or thermoplastic elastomer (TPE) granulates, such as thermoplastic polyurethanes (TPU) or thermoplastic polyester (TPEE) or mixtures of the above-mentioned polymers are used as thermoplastic polymers. Most preferably thermoplastic polyurethanes are used as thermoplastic polymers.

Suitable thermoplastic elastomers for producing the foams, moldings or molded bodies according to the invention are known per se to the person skilled in the art. Suitable thermoplastic elastomers are described, for example, in "Handbook of Thermoplastic Elastomers", 2nd edition June 2014.

Preferably, the thermoplastic elastomer, in particular directed to the molded body, can be thermoplastic polyurethanes (TPU), thermoplastic polyamides, for example polyether copolyamides (TPA), thermoplastic elastomer based on olefin, for example polypropylene or polyethylene (TPO), thermoplastic polyesterelastomers, for example polyetheresters or polyesteresters (TPC), thermoplastic vulcanizate (TPV), thermoplastic styrenic elastomers, for example thermoplastic styrene butadiene block copolymer (TPS), or mixtures thereof.

Preferably, the thermoplastic elastomer has a soft phase with a glass transition temperature Tg in the range of from <10° C. determined by dynamic mechanical thermal analysis determined by loss factor (tan δ) according to DIN EN ISO 6721-1-2011-08 at a heating rate of 2 K/min at a frequency of 1 Hz in torsion mode. Deviant from the DIN norm, the temperature was adjusted step wise by 5 K and 35 s per step which corresponds to a continuous heating rate of 2 K/min. The measurements were conducted with a sample with a ratio of width:thickness of 1:6. The sample was prepared by injection molding followed by annealing of the material at 100° C. for 20 h.

Therefore, according to a further embodiment, the present invention is also directed to the process as disclosed above, wherein the thermoplastic elastomer has a soft phase with a glass transition temperature Tg in the range of from <10° C. more preferable below −10° C., particularly preferred below −30° C. determined by dynamic mechanical thermal analysis determined by loss factor (tan δ) according to DIN EN ISO 6721-1-2011-08 at a heating rate of 2 K/min at a frequency of 1 Hz in torsion mode. Deviant from the DIN norm, the temperature was adjusted step wise by 5 K and 35 s per step which corresponds to a continuous heating rate of 2 K/min.

The measurements were conducted with a sample with a ratio of width:thickness of 1:6. The sample was prepared by injection molding followed by annealing of the material at 100° C. for 20 h.

According to a further embodiment, the present invention is directed to the molded body as disclosed above, wherein the thermoplastic elastomer has a soft phase with a glass transition temperature Tg in the range of from <10° C. determined by dynamic mechanical thermal analysis determined by loss factor (tan δ) according to DIN EN ISO 6721-1-2011-08 at a heating rate of 2 K/min at a frequency of 1 Hz in torsion mode. Deviant from the DIN norm, the temperature was adjusted step wise by 5 K and 35 s per step which corresponds to a continuous heating rate of 2 K/min. The measurements were conducted with a sample with a ratio of width:thickness of 1:6. The sample was prepared by injection molding followed by annealing of the material at 100° C. for 20 h.

For thermoplastic polyether ester and polyester ester preparation suitable aromatic dicarboxylic acids include e.g. phthalic acid, iso- and terephthalic acid or their esters. Suitable aliphatic dicarboxylic acids include e.g. cyclohexane-1,4-dicarboxylic acid, adipic acid, sebacic acid, azelaic acid and decanedicarboxylic acid as saturated dicarboxylic acids as well as maleic acid, fumaric acid, aconitic acid, itaconic acid, tetrahydrophthalic acid and tetrahydroterephthalic acid as unsaturated dicarboxylic acids. Suitable diol components are, for example, diols of the general formula HO—(CH2)n-OH, with n=2 to 20, such as ethylene glycol, propanediol (1,3), butanediol (1,4) or hexanediol (1,6). Polyetherols of the general formula HO—(CH2)n-O—(CH2)m-OH, where n is equal to or different from m and n or m=2 to 20, unsaturated diols and polyetherols such as butenediol-(1,4); diols and polyetherols containing aromatic units; as well as polyesterols. In addition to the carboxylic acids or their esters mentioned, and the alcohols mentioned, all other common representatives of these classes of compounds can be used to provide the polyether esters and polyester esters used according to the invention.

The thermoplastic polyetheramides can be obtained by the reaction of amines and carboxylic acids or their esters by all of the methods known from the literature. Amines and or carboxylic acid also contain ether units of the type R—O—R, where R=organic radical (aliphatic and/or aromatic). In general, monomers of the following classes of compounds are used: HOOC—R'—NH2, where R' can be aromatic and aliphatic, preferably containing ether units of the type R—OR, where R=organic radical (aliphatic and/or aromatic); aromatic dicarboxylic acids, e.g. phthalic acid, isophthalic acid and terephthalic acid or their esters and aromatic dicarboxylic acids containing ether units of the type R—O—R, where R=organic radical (aliphatic and/or aromatic); aliphatic dicarboxylic acids, e.g. cyclohexane-1,4-dicarboxylic acid, adipic acid, sebacic acid, azelaic acid and decanedicarboxylic acid as saturated dicarboxylic acids as well as maleic acid, fumaric acid, aconitic acid, itaconic acid, tetrahydrophthalic acid and tetrahydroterephthalic acid as unsaturated as well as aliphatic dicarboxylic acids R=containing organic units, R being ether units, ether units can be aliphatic and/or aromatic); diamines of the general formula H2N—R"—NH2, where R" is aromatic and aliphatic, preferably containing ether units of the type R—O—R, where R=organic radical (aliphatic and/or aromatic); lactams such as ε-caprolactam, pyrrolidone or laurolactam; as well as amino acids.

In addition to the carboxylic acids or their esters mentioned, and the amines, lactams and amino acids mentioned, all other common representatives of these classes of compounds can be used to provide the polyetheramine used according to the invention.

The thermoplastic elastomers with block copolymer structure used according to the invention preferably contain vinylaromatic, butadiene and isoprene as well as polyolefin and vinyl units, for example ethylene, propylene and vinyl acetate units. Styrene-butadiene copolymers are preferred.

The thermoplastic elastomers with block copolymer structure, polyether amides, polyether esters and polyester esters used according to the invention are preferably selected such that their melting points are ≤300° C., preferably ≤250° C., in particular ≤220° C.

The thermoplastic elastomers with block copolymer structure, polyether amides, polyether esters and polyester esters used according to the invention can be partially crystalline or amorphous.

Suitable olefin-based thermoplastic elastomers (TPO) in particular have a hard segment and a soft segment, the hard segment being, for example, a polyolefin such as polypropylene and polyethylene and the soft segment being a rubber component such as ethylene-propylene rubber. Blends of a polyolefin and a rubber component, dynamically cross-linked types and polymerized types are suitable.

For example, structures are suitable in which an ethylene-propylene rubber (EPM) is dispersed in polypropylene; structures in which a cross-linked or partially cross-linked ethylene-propylenediene rubber (EPDM) is dispersed in polypropylene; statistical copolymers of ethylene and an α-olefin, such as propylene and butene; or block copolymers of a polyethylene block and an ethylene/α-olefin copolymer block. Suitable α-olefins are, for example, propylene, 1-butene, 1-pentene, 1-hexene, 1-heptene, 1-octene, 1-nonen, 1-n decene, 3-methyl-1-butene and 4-methyl-1-pentene or mixtures of these olefins.

Suitable semicrystalline polyolefins are, for example, homopolymers of ethylene or propylene or copolymers containing monomeric ethylene and/or propylene units. Examples are copolymers of ethylene and propylene or an alpha olefin with 4-12 C atoms and copolymers of propylene and an alpha olefin with 4-12 C atoms. The concentration of ethylene or the propylene in the copolymers is preferably so high that the copolymer is semicrystalline.

In the case of statistical copolymers, for example, an ethylene content or a propylene content of about 70 mol % or more are suitable.

Suitable polypropylenes are propylene homopolymers or also polypropylene block copolymers, for example statistical copolymers of propylene and up to about 6 mol % of ethylene.

Suitable thermoplastic styrene block copolymers usually have polystyrene blocks and elastomeric blocks. Suitable styrene blocks are selected, for example, from polystyrene, substituted polystyrenes, poly (alpha-methylstyrenes), ring-halogenated styrenes and ring-alkylated styrenes. Suitable elastomeric blocks are, for example, polydiene blocks such as polybutadienes and polyisoprenes, poly (ethylene/butylene) copolymers and poly (ethylene/propylene) copolymers, polyisobutylenes, or also polypropylene sulfides or polydiethylsiloxanes.

Further suitable thermoplastic elastomers are thermoplastic polyurethanes (TPU). Also thermoplastic polyurethanes are well known. They are produced by reaction of isocyanates with isocyanate-reactive compounds for example polyols with number-average molar mass from 500 g/mol to 10000 g/mol and optionally chain extenders with molar mass from 50 g/mol to 499 g/mol, optionally in the presence of catalysts and/or conventional auxiliaries and/or additional substances. For the purposes of the present invention, preference is given to thermoplastic polyurethanes obtainable via reaction of isocyanates with isocyanate-reactive compounds for example polyols with number-average molar mass from 500 g/mol to 10000 g/mol and a chain extender with molar mass from 50 g/mol to 499 g/mol, optionally in the presence of catalysts and/or conventional auxiliaries and/or additional substances.

The isocyanate, isocyanate-reactive compounds for example polyols and, if used, chain extenders are also, individually or together, termed structural components. The structural components together with the catalyst and/or the customary auxiliaries and/or additional substances are also termed starting materials.

The molar ratios of the quantities used of the polyol component can be varied in order to adjust hardness and melt index of the thermoplastic polyurethanes, where hardness and melt viscosity increase with increasing content of chain extender in the polyol component at constant molecular weight of the TPU, whereas melt index decreases.

For production of the thermoplastic polyurethanes, isocyanates and polyol component, where the polyol component in a preferred embodiment also comprises chain extenders, are reacted in the presence of a catalyst and optionally auxiliaries and/or additional substances in amounts such that the equivalence ratio of NCO groups of the diisocyanates to the entirety of the hydroxyl groups of the polyol component is in the range from 1:0.8 to 1:1.3.

Another variable that describes this ratio is the index. The index is defined via the ratio of all of the isocyanate groups used during the reaction to the isocyanate-reactive groups, i.e. in particular the reactive groups of the polyol component and the chain extender. If the index is 1000, there is one active hydrogen atom for each isocyanate group. At indices above 1000, there are more isocyanate groups than isocyanate-reactive groups.

An equivalence ratio of 1:0.8 here corresponds to an index of 1250 (index 1000=1:1), and a ratio of 1:1.3 corresponds to an index of 770.

In a preferred embodiment, the index in the reaction of the abovementioned components is in the range from 965 to 1110, preferably in the range from 970 to 1110, particularly preferably in the range from 980 to 1030, and also very particularly preferably in the range from 985 to 1010.

Preference is given in the invention to the production of thermoplastic polyurethanes where the weight-average molar mass (Mw) of the thermoplastic polyurethane is at least 60 000 g/mol, preferably at least 80 000 g/mol and in particular greater than 100 000 g/mol. The upper limit of the weight-average molar mass of the thermoplastic polyurethanes is very generally determined by processability, and also by the desired property profile. The number-average molar mass of the thermoplastic polyurethanes is preferably from 80 000 to 300 000 g/mol. The average molar masses stated above for the thermoplastic polyurethane, and also for the isocyanates and polyols used, are the weight averages determined by means of gel permeation chromatography (e.g. in accordance with DIN 55672-1, March 2016).

Organic isocyanates that can be used are aliphatic, cycloaliphatic, araliphatic and/or aromatic isocyanates.

Aliphatic diisocyanates used are customary aliphatic and/or cycloaliphatic diisocyanates, for example tri-, tetra-, penta-, hexa-, hepta- and/or octamethylene diisocyanate, 2-methylpentamethylene 1,5-diisocyanate, 2-ethyltetramethylene 1,4-diisocyanate, hexamethylene 1,6-diisocyanate (HDI), pentamethylene 1,5-diisocyanate, butylene 1,4-diisocyanate, trimethylhexamethylene 1,6-diisocyanate, 1-isocyanato-3,3,5-trimethyl-5-isocyanatomethylcyclohexane (isophorone diisocyanate, IPDI), 1,4- and/or 1,3-bis(isocyanatomethyl)cyclohexane (HXDI), cyclohexane 1,4-diisocyanate, 1-methylcyclohexane 2,4- and/or 2,6-diisocyanate, methylenedicyclohexyl 4,4'-, 2,4'- and/or 2,2'-diisocyanate (H12MDI).

Suitable aromatic diisocyanates are in particular naphthylene 1,5-diisocyanate (NDI), tolylene 2,4- and/or 2,6-diisocyanate (TDI), 3,3'-dimethyl-4,4'-diisocyanatobiphenyl (TODI), p-phenylene diisocyanate (PDI), diphenylethane 4,4'-diisoyanate (EDI), methylenediphenyl diisocyanate (MDI), where the term MDI means diphenylmethane 2,2', 2,4'- and/or 4,4'-diisocyanate, 3,3'-dimethyldiphenyl diisocyanate, 1,2-diphenylethane diisocyanate and/or phenylene diisocyanate.

Mixtures can in principle also be used. Examples of mixtures are mixtures comprising at least a further methylenediphenyl diisocyanate alongside methylenediphenyl 4,4'-diisocyanate. The term "methylenediphenyl diisocyanate" here means diphenylmethane 2,2'-, 2,4'- and/or 4,4'-diisocyanate or a mixture of two or three isomers. It is therefore possible to use by way of example the following as further isocyanate: diphenylmethane 2,2'- or 2,4'-diisocyanate or a mixture of two or three isomers. In this embodiment, the polyisocyanate composition can also comprise other above-mentioned polyisocyanates.

Other examples of mixtures are polyisocyanate compositions comprising 4,4'-MDI and 2,4'-MDI, or 4,4'-MDI and 3,3'-dimethyl-4,4'-diisocyanatobiphenyl (TODI) or 4,4'-MDI and H12MDI (4,4'-methylene dicyclohexyl diisocyanate) or 4,4'-MDI and TDI; or 4,4'-MDI and 1,5-naphthylene diisocyanate (NDI).

In accordance with the invention, three or more isocyanates may also be used. The polyisocyanate composition commonly comprises 4,4'-MDI in an amount of from 2 to 50%, based on the entire polyisocyanate composition, and the further isocyanate in an amount of from 3 to 20%, based on the entire polyisocyanate composition.

The polyisocyanate composition may also comprise one or more solvents. Suitable solvents are known to those skilled in the art. Suitable examples are nonreactive solvents such as ethyl acetate, methyl ethyl ketone and hydrocarbons.

As isocyanate-reactive compound it is possible to use a compound which preferably has a reactive group selected from the hydroxyl group, the amino groups, the mercapto group and the carboxylic acid group. Preference is given here to the hydroxyl group and very particular preference is given here to primary hydroxyl groups. It is particularly preferable that the isocyanate-reactive compound is selected from the group of polyesterols, polyetherols and polycarbonatediols, these also being covered by the term "polyols".

The statistical average number of hydrogen atoms exhibiting Zerewitinoff activity in the isocyanate-reactive compound is at least 1.8 and at most 2.2, preferably 2; this number is also termed the functionality of the isocyanate-reactive compound, and states the quantity of isocyanate-reactive groups in the molecule, calculated theoretically for a single molecule, based on a molar quantity. The isocyanate-reactive compound preferably is substantially linear and is one isocyanate-reactive substance or a mixture of various substances, where the mixture then meets the stated requirement.

Suitable polyols in the invention are homopolymers, for example polyetherols, polyesterols, polycarbonatediols, polycarbonates, polysiloxanediols, polybutadienediols, and also block copolymers, and also hybrid polyols, e.g. poly(ester/amide). Preferred polyetherols in the invention are polyethylene glycols, polypropylene glycols, polytetramethylene glycol (PTHF), polytrimethylene glycol. Preferred polyester polyols are polyadipates, polysuccinic esters and polycaprolactones.

In another embodiment, the present invention also provides a thermoplastic polyurethane as described above where the polyol composition comprises a polyol selected from the group consisting of polyetherols, polyesterols, polycaprolactones and polycarbonates.

Examples of suitable block copolymers are those having ether and ester blocks, for example polycaprolactone having polyethylene oxide or polypropylene oxide end blocks, and also polyethers having polycaprolactone end blocks. Preferred polyetherols in the invention are polyethylene glycols, polypropylene glycols, polycaprolactone and polytrimethylene glycol. Preference is further given to polytetramethylene glycol (PTHF).

In a particularly preferred embodiment, the molar mass $M_n$ of the polyol used is in the range from 500 g/mol to 10000 g/mol, preferably in the range from 500 g/mol to 5000 g/mol, in particular from 500 g/mol to 3000 g/mol.

Another embodiment of the present invention accordingly provides a thermoplastic polyurethane as described above where the molar mass $M_n$ of at least one polyol comprised in the polyol composition is in the range from 500 g/mol to 10000 g/mol.

It is also possible in the invention to use mixtures of various polyols.

An embodiment of the present invention uses, for the production of the thermoplastic polyurethane, at least one polyol composition comprising at least polytetrahydrofuran. The polyol composition in the invention can also comprise other polyols alongside polytetrahydrofuran.

Materials suitable by way of example as other polyols in the invention are polyethers, and also polyesters, block copolymers, and also hybrid polyols, e.g. poly(ester/amide). Examples of suitable block copolymers are those having ether and ester blocks, for example polycaprolactone having polyethylene oxide or polypropylene oxide end blocks, and also polyethers having polycaprolactone end blocks. Preferred polyetherols in the invention are polyethylene glycols and polypropylene glycols. Preference is further given to polycaprolactone as other polyol.

Examples of suitable polyols are polyetherols such as polytrimethylene oxide and polytetramethylene oxide.

Another embodiment of the present invention accordingly provides a thermoplastic polyurethane as described above where the polyol composition comprises at least one polytetrahydrofuran and at least one other polyol selected from the group consisting of another polytetramethylene oxide (PTHF), polyethylene glycol, polypropylene glycol and polycaprolactone.

In a particularly preferred embodiment, the number-average molar mass $M_n$ of the polytetrahydrofuran is in the range from 500 g/mol to 5000 g/mol, more preferably in the range from 550 to 2500 g/mol, particularly preferably in the range from 650 to 2000 g/mol and very preferably in the range from 650 to 1400 g/mol.

The composition of the polyol composition can vary widely for the purposes of the present invention. By way of example, the content of the first polyol, preferably of polytetrahydrofuran, can be in the range from 15% to 85%, preferably in the range from 20% to 80%, more preferably in the range from 25% to 75%.

The polyol composition in the invention can also comprise a solvent. Suitable solvents are known per se to the person skilled in the art.

Insofar as polytetrahydrofuran is used, the number-average molar mass Mn of the polytetrahydrofuran is by way of example in the range from 500 g/mol to 5000 g/mol, preferably in the range from 550 to 2500 g/mol, particular preferably in the range from 650 to 2000 g/mol. It is further preferable that the number-average molar mass Mn of the polytetrahydrofuran is in the range from 650 to 1400 g/mol.

The number-average molar mass Mn here can be determined as mentioned above by way of gel permeation chromatography.

Another embodiment of the present invention also provides a thermoplastic polyurethane as described above where the polyol composition comprises a polyol selected from the group consisting of polytetrahydrofurans with number-average molar mass Mn in the range from 500 g/mol to 5000 g/mol preferably in the range from 550 to 2500 g/mol, particular preferably in the range from 650 to 2000 g/mol. It is further preferable that the number-average molar mass Mn of the polytetrahydrofuran is in the range from 650 to 1400 g/mol.

It is also possible in the invention to use mixtures of various polytetrahydrofurans, i.e. mixtures of polytetrahydrofurans with various molar masses.

Preferably the polyol composition comprises at least one aliphatic polyol, preferably polytetramethylene glycol (polytetrahydrofuran, PTHF).

The number average molecular mass Mn of the polyol composition for example is in the range of from 650 g/mol to 5000 g/mol, preferably in the range of from 2000 g/mol to 3500 g/mol, most preferably in the range of from 2000 g/mol to 3000 g/mol.

Preferably the polyol composition is comprising PTHF and PTHF has a number average molecular mass Mn in the range of from equal or below 1500 g/mol.

Preferably the polyol composition is consisting of PTHF and PTHF has a number average molecular mass Mn in the range of from 1000 g/mol to 1500 g/mol.

Preferably the polyol composition is comprising a block copolymer with at least one block of PTHF and preferably the number average molecular mass Mn of the block copolymer is in the range of from 2000 g/mol to 3500 g/mol.

According to a further aspect, the present invention is directed to a preparation for a molded body, wherein the thermoplastic elastomer is a thermoplastic polyisocyanate reaction product obtained or obtainable by reacting the components
(A) a polyisocyanate composition
(B) at least one chain extender
(C) a polyol composition
(D) optionally water
(E) optionally a cross-linker
(F) optionally a plasticizer
(G) optionally additional additives,
wherein the preparation contains a polyol composition having a glass transition temperature Tg in the range of from equal or below −50° C., determined by dynamic mechanical thermal analysis determined by loss factor (tan δ) according to DIN EN ISO 6721-2011-08 at a heating rate of 2 K/min at a frequency of 1 Hz.

Chain extenders used are preferably aliphatic, araliphatic, aromatic and/or cycloaliphatic compounds with a molar mass from 50 g/mol to 499 g/mol, preferably having 2 isocyanate-reactive groups, also termed functional groups. Preferred chain extenders are diamines and/or alkanediols, more preferably alkanediols having from 2 to 10 carbon atoms, preferably having from 3 to 8 carbon atoms in the alkylene moiety, these more preferably having exclusively primary hydroxy groups.

Preferred embodiments use chain extenders, these being preferably aliphatic, araliphatic, aromatic and/or cycloaliphatic compounds with molar mass from 50 g/mol to 499 g/mol, preferably having 2 isocyanate-reactive groups, also termed functional groups. It is preferable that the chain extender is at least one chain extender selected from the group consisting of ethylene 1,2-glycol, propane-1,2-diol, propane-1,3-diol, butane-1,4-diol, butane-2,3-diol, pentane-1,5-diol, hexane-1,6-diol, diethylene glycol, dipropylene glycol, cyclohexane-1,4-diol, cyclohexane-1,4-dimethanol, neopentyl glycol and hydroquinone bis(beta-hydroxyethyl) ether (HQEE). Particularly suitable chain extenders are those selected from the group consisting of 1,2-ethanediol, propane-1,3-diol, butane-1,4-diol and hexane-1,6-diol, and also mixtures of the abovementioned chain extenders. Examples of specific chain extenders and mixtures are disclosed inter alia in PCT/EP2017/079049.

The ratio of polyols and chain extender used is varied in a manner that gives the desired hard-segment content, which can be calculated by the formula disclosed in PCT/EP2017/079049. A suitable hard segment content here is below 60%, preferably below 40%, particularly preferably 25%.

Crosslinkers can be used as well, moreover, examples being the aforesaid higher-functionality polyisocyanates or polyols or else other higher-functionality molecules having a plurality of isocyanate-reactive functional groups. It is also possible within the context of the present invention for the products to be crosslinked by an excess of the isocyanate groups used, in relation to the hydroxyl groups. Examples of higher-functionality isocyanates are triisocyanates, e.g. triphenylmethane 4,4',4"-triisocyanate, and also isocyanurates, and also the cyanurates of the aforementioned diisocyanates, and the oligomers obtainable by partial reaction of diisocyanates with water, for example the biurets of the aforementioned diisocyanates, and also oligomers obtainable by controlled reaction of semiblocked diisocyanates with polyols having an average of more than two and preferably three or more hydroxyl groups.

The amount of crosslinkers here, i.e. of higher-functionality isocyanates and higher-functionality polyols, ought not to exceed 3% by weight, preferably 1% by weight, based on the overall mixture of components.

Preferably the cross-linker selected from the group consisting of higher-functionality polyisocyanates and higher-functionality polyols increase the stability of the molded body. Further preferred is that additional additives selected from the group consisting of filler, lubricants, stabilizer, catalysts, flame retardants or plasticizers are added for adjusting stiffness.

In preferred embodiments, catalysts are used with the structural components. These are in particular catalysts which accelerate the reaction between the NCO groups of the isocyanates and the hydroxyl groups of the isocyanate-reactive compound and, if used, the chain extender.

Examples of catalysts that are further suitable are organometallic compounds selected from the group consisting of organyl compounds of tin, of titanium, of zirconium, of hafnium, of bismuth, of zinc, of aluminum and of iron, examples being organyl compounds of tin, preferably dialkyltin compounds such as dimethyltin or diethyltin, or tin-organyl compounds of aliphatic carboxylic acids, preferably tin diacetate, tin dilaurate, dibutyltin diacetate, dibutyltin dilaurate, bismuth compounds, for example alkylbismuth compounds or the like, or iron compounds, preferably iron(III) acetylacetonate, or the metal salts of carboxylic acids, e.g. tin(II) isooctanoate, tin dioctanoate, titanic esters or bismuth(III) neodecanoate. Particularly preferred catalysts are tin dioctanoate, bismuth decanoate and titanic esters. Quantities preferably used of the catalyst are from 0.0001 to 0.1 part by weight per 100 parts by weight of the isocyanate-reactive compound. Other compounds that can be added, alongside catalysts, to the structural components are conventional auxiliaries. Mention may be made by way of example of surface-active substances, fillers, flame retardants, nucleating agents, oxidation stabilizers, lubricating and demolded body aids, dyes and pigments, and optionally stabilizers, preferably with respect to hydrolysis, light, heat or discoloration, inorganic and/or organic fillers, reinforcing agents and/or plasticizers.

Stabilizers for the purposes of the present invention are additives which protect a plastic or in particular a molded body from damaging environmental effects. Examples are primary and secondary antioxidants, sterically hindered phenols, hindered amine light stabilizers, UV absorbers, hydrolysis stabilizers, quenchers and flame retardants. Examples of commercially available stabilizers are found in Plastics Additives Handbook, 5th edn., H. Zweifel, ed., Hanser Publishers, Munich, 2001 ([1]), pp. 98-136.

According to the present invention, a composition for preparation of a molded body comprises the thermoplastic elastomer. The composition may comprise further components such as further thermoplastic elastomers or fillers. In the context of the present invention, the term fillers encompasses organic and inorganic fillers such as for example further polymers.

The composition may comprise the thermoplastic elastomer in an amount in the range of from 85 to 100 wt.-% based on the weight of the composition.

Unless otherwise noted, the amounts of the components of the composition add up to 100 wt.-%.

According to a further embodiment, the present invention is directed to the molded body as disclosed above, wherein the composition comprises a filler in an amount in the range of from 0.1 to 20 wt.-% based on weight of the composition.

According to a further embodiment, the present invention is directed to the process as disclosed above, wherein the composition comprises a filler in an amount in the range of from 0.1 to 15 wt.-% based on the weight of the composition.

The filler may for example be selected from the group consisting of organic fillers such as polystyrene, polyethylene, polypropylene, polyethylene terephthalate, polycarbonates, polyamides, polybutylene terephthalate, polyethylene terephthalates and polylactic acids.

Inorganic fillers such as talcum, chalk, carbon black also can be used in the context of the present invention. Suitable fillers for thermoplastic elastomers are in principle known to the person skilled in the art.

According to a further embodiment, the composition may for example comprise styrene polymers such as atactic, syndiotactic or isotactic polystyrene, more preferably atactic polystyrene.

Atactic polystyrene of the invention, which is amorphous, has a glass transition temperature in the range of 100° C.±20° C. (determined according to DIN EN ISO 11357-1, February 2017/DIN EN ISO 11357-2, July 2014, Inflection point method). Syndiotactic and isotactic polystyrene of the invention are each semicrystalline and have a melting point in the region respectively of 270° C. and 240° C. (DIN EN ISO 11357-1, February 2017/DIN EN ISO 11357-3, April 2013, peak melting temperature).

The polystyrenes used have a modulus of elasticity in tension of more than 2500 MPa (DIN EN ISO 527-1/2, June 2012).

The production and processing of the polystyrenes of the invention is described extensively in the literature, for example in Kunststoff-Handbuch Band 4, "Polystyrol" [Plastics handbook, vol. 4, "Polystyrene"], by Becker/Braun (1996).

Commercially available materials can also be used, for example PS 158 K (Ineos), PS 148 H Q (Ineos), STYROLUTION PS 156 F, STYROLUTION PS 158N/L, STYROLUTION PS 168N/L, STYROLUTION PS 153F, SABIC PS 125, SABIC PS 155, SABIC PS 160.

The composition of the molded body may also comprise styrene with a modulus of elasticity below 2700 MPa (DIN EN ISO 527-1/2, June 2012), such as styrene polymers selected from the group of the thermoplastic elastomers based on styrene, and of the high-impact polystyrenes (HIPS) which by way of example include SEBS, SBS, SEPS, SEPS-V and acrylonitrile-butadiene-styrene copolymers (ABS), very particular preference being given here to high-impact polystyrene (HIPS).

Commercially available materials can be used here, for example Styron A-TECH 1175, Styron A-TECH 1200, Styron A-TECH 1210, Styrolution PS 495S, Styrolution PS 485N, Styrolution PS 486N, Styrolution PS 542N, Styrolution PS 454N, Styrolution PS 416N, ROchling PS HI, SABIC PS 325, SABIC PS 330.

The use of fillers further reduces the required energy needed for molding to achieve a specified tensile strength, and reduced energy advantageously leads to higher compression strength of the molded body obtained.

The materials obtained have a lower melting point compared to the respective materials without filler which is advantageous for the preparation process.

Another preferred embodiment is a molded body obtained or obtainable by a process for preparing foamed granules for a molded body comprising the steps of
(i) providing a composition containing a thermoplastic polyurethane, wherein the thermoplastic polyurethane is obtained or obtainable by reacting the components
(A) a polyisocyanate composition
(B) at least one chain extender
(C) a polyol composition with a glass transition temperature Tg in the range of from equal or below −50° C., determined by dynamic mechanical thermal analysis determined by loss factor (tan δ) according to DIN EN ISO 6721-2011-08 at a heating rate of 2 K/min at a frequency of 1 Hz.,
(D) optionally water
(E) optionally a cross-linker
(F) optionally a plasticizer
(G) optionally additional additives, (ii) impregnating the composition from step (i) with a blowing agent under pressure, (iii) expanding the composition from step (i) via pressure drop.

Suitable production processes for the thermoplastic elastomers or foams or foamed granules from the thermoplastic elastomers mentioned are likewise known to the person skilled in the art.

Suitable thermoplastic polyether esters and polyester esters can be prepared by all the conventional processes known from the literature by transesterification or esterification of aromatic and aliphatic dicarboxylic acids having 4 to 20 carbon atoms or their esters with suitable aliphatic and aromatic diols and polyols (cf. "Polymer Chemistry", Interscience Publ., New York, 1961, p. 111-127; Kunststoff Handbuch, Volume VIII, C. Hanser Verlag, Munich 1973 and Journal of Polymer Science, Part A1, 4, pages 1851-1859 (1966)).

According to a further embodiment, the present invention is directed to the process as disclosed above, wherein the thermoplastic polymer is selected from the group consisting of thermoplastic polyurethanes, thermoplastic polyamides and thermoplastic polyetheresters, polyesteresters and mixtures thereof.

According to a further embodiment, the present invention is directed to the process as disclosed above, wherein the thermoplastic elastomer is selected from the group consisting of thermoplastic polyurethanes.

The non-expanded polymer mixture of the composition for a molded body required for the preparation of the foamed granules is prepared in a known manner from the individual components as well as optionally other components such as processing aids, stabilizers, tolerability agents or pigments. Suitable methods are, for example, common mixing methods with the help of a kneader, continuous or discontinuous, or an extruder such as an identical twin-screw extruder.

The thermoplastic polyurethanes may be produced batchwise or continuously by the known processes, for example using reactive extruders or the belt method by the "one-shot" method or the prepolymer process, preferably by the "one-shot" method. In the "one-shot" method, the components to be reacted, and in preferred embodiments also the chain extender in the polyol component, and also catalyst and/or additives, are mixed with one another consecutively or simultaneously, with immediate onset of the polymerization reaction. The TPU can then be directly pelletized or converted by extrusion to lenticular pellets. In this step, it is possible to achieve concomitant incorporation of other adjuvants or other polymers.

In the extruder process, structural components, and in preferred embodiments also the chain extender, catalyst and/or additives, are introduced into the extruder individually or in the form of mixture and reacted, preferably at temperatures of from 100° C. to 280° C., preferably from 140° C. to 250° C. The resultant polyurethane is extruded, cooled and pelletized, or directly pelletized by way of an underwater pelletizer in the form of lenticular pellets.

It is possible to introduce further additives (components, excipients, fillers) such as impact modifiers, dyes, stabilizers, antioxidants. In this step, some of the above usual excipients (additives, fillers, components) can be added to the mixture.

In a preferred process, a thermoplastic polyurethane is produced from structural components isocyanate, isocyanate-reactive compound including chain extender, and in preferred embodiments the other raw materials in a first step, and the additional substances or auxiliaries are incorporated in a second extrusion step.

It is preferable to use a twin-screw extruder, because twin-screw extruders operate in force-conveying mode and thus permit greater precision of adjustment of temperature and quantitative output in the extruder. Production and expansion of a TPU can moreover be achieved in a reactive extruder in a single step or by way of a tandem extruder by methods known to the person skilled in the art.

Processes for producing foamed pellets from thermoplastic elastomers are known per se to the person skilled in the art. If, according to the invention, a foamed granulate made of the thermoplastic elastomer is used, the bulk density of the foamed granulate is, for example, in the range from 20 g/l to 300 g/l.

The foamed granules according to the invention usually have a bulk density of 50 g/l to 200 g/l, preferably 60 g/l to 180 g/l, more preferably 80 g/l to 150 g/l. The bulk density is measured analogously to DIN ISO 697, wherein in the determination of the above values in contrast to the standard, a vessel with 0.5 l volume is used instead of a vessel with 0.5 l volume, since especially for the foam particles with low density and large mass a measurement with only 0.5 l volume is too inaccurate.

As stated above, the diameter of the foamed granules is between 0.5 and 30; preferably 1 to 15 and in particular between 3 to 12 mm. For foamed granules that are not spherical, e.g. elongated or cylinder-shaped, the longest dimension is meant by diameter.

The production of the foamed granules can be carried out according to the usual methods known in the prior art by
(i) Providing a composition according to the invention;
(ii) Impregnation of the composition with a propellant under pressure;
(iii) Expanding the composition for foamed granules and/or molded body by means of pressure drop.

The propellant quantity is preferably 0.1 to 40, in particular 0.5 to 35 and more preferably 1 to parts by weight, based on 100 parts by weight of the amount of composition used.

In one embodiment the above-mentioned method includes:
(i) Providing a composition according to the invention in the form of a granulate;
(ii) Impregnation of the granulate with a propellant under pressure;
(iii) Expanding the granules by means of pressure drop.

Another embodiment of the above-mentioned method includes another step:
(i) Providing a composition according to the invention in the form of a granulate;
(ii) Impregnation of the granulate with a propellant under pressure;
(iii-a) Reducing the pressure to normal pressure without foaming the granules, if necessary by reducing the temperature in advance
(iii-b) foaming of the granules by increasing the temperature.

Preferably, the non-expanded granules have an average minimum diameter of 0.2-10 mm (determined via 3D evaluation of the granulate, e.g. via dynamic image analysis with the use of an optical measuring apparatus called Partan 3D by Microtrac).

The individual granules usually have an average mass in the range of 0.1 to 50 mg, preferably in the range of 4 to 40 mg and particularly preferably in the range of 7 to 32 mg.

This mean mass of the granules (particle weight) is determined as an arithmetic method by weighing 10 granulate particles each.

In a preferred embodiment the above-mentioned method includes the impregnation of a polymer granulate with a propellant under pressure and subsequent expansion of the granules in step (I) and (II):

(I) Impregnation of the granulate in the presence of a propellant under pressure at elevated temperatures in a suitable closed reaction vessel (e.g. autoclaves);

(II) sudden relaxation without cooling.

Herein, the impregnation in step (I) can be carried out in the presence of water as well as optional suspension aids or only in the presence of the propellant and absence of water.

Suitable suspension aids are e.g. water-insoluble inorganic stabilizers, such as tricalcium phosphate, magnesium pyrophosphate, metal carbonates, polyvinyl alcohol and surfactants, such as sodium dodecyl aryl sulfonate. They are usually used in amounts of 0.05 to 10 wt.-%, based on the composition of the invention.

The impregnation temperatures are depending on the selected pressure in the range of 100° C.-200° C., wherein the pressure in the reaction vessel is in the range of 2 to 150 bar, preferably in the range of 5 and 100 bar, more preferably in the range of 20 and 60 bar, the impregnation period is generally 0.5 to 10 hours.

The execution of the method in suspension is known to the skilled person and described e.g. in detail in WO2007/082838.

When performing the process in the absence of the propellant, care must be taken to avoid the aggregation of the polymer granules.

Suitable propellants for carrying out the process in a suitable closed reaction vessel are, for example, organic liquids and gases which are present in a gaseous state under the processing conditions, such as hydrocarbons or inorganic gases or mixtures of organic liquids or gases and inorganic gases, wherein these can also be combined.

Suitable hydrocarbons are, for example, halogenated or non-halogenated, saturated or unsaturated aliphatic hydrocarbons, preferably non-halogenated, saturated or unsaturated aliphatic hydrocarbons.

Preferred organic propellants are saturated, aliphatic hydrocarbons, in particular those with 3 to 8 C atoms such as butane or pentane.

Suitable inorganic gases are nitrogen, air, ammonia or carbon dioxide, preferably nitrogen or carbon dioxide or mixtures of the gases mentioned above.

In a further embodiment, the process comprises impregnation of the granules with a propellant under pressure and subsequent expansion of the granules in step ($\alpha$) and ($\beta$):

($\alpha$) Impregnation of the granulate in the presence of a propellant under pressure at elevated temperatures in an extruder;

($\beta$) Granulation of the mass from the extruder under conditions that prevent uncontrolled foaming.

Suitable propellants in this process variant are volatile organic compounds with a boiling point at normal pressure 1013 mbar from −25° C. to 150° C., in particular −10° C. to 125° C. Well suited are hydrocarbons (preferably halogen-free), in particular C4-10 alkanes, for example, the isomers of the butane, pentane, hexane, heptane and octane, particularly preferably iso-butane. Other possible propellants are also more sterically demanding compounds such as alcohols, ketones, esters, ethers and organic carbonates.

Herein, the composition in the step (ii) in an extruder is mixed under melting with the propellant under pressure, which is fed to the extruder. The propellant-containing mixture is pressed under pressure, preferably with moderately controlled back pressure (e.g. underwater granulation) and granulated. Herein, the melt string foams up, and the foamed granules are obtained by granulation.

The execution of the process via extrusion is known to the skilled person and described in detail, for example, in WO2007/082838 and WO2013/153190.

As extruders, all the usual screw machines can be considered, in particular single-screw and twin-screw extruders (e.g. type ZSK by Werner & Pfleiderer), co-kneaders, combi-plastic machines, MPC kneaders, FCM mixers, KEX kneader screw extruders and shear roller extruders, as they are disclosed e.g. in Saechtling (ed.), Plastic paperback, 27th edition 3.2.1 and 3.2.4. The extruder is usually operated at a temperature at which the composition (Z1) is present as a melt, for example at 120° C. to 250° C., in particular 150° C. to 210° C. and a pressure after the addition of the propellant of 40 to 200 bar, preferably 60 to 150 bar, particularly preferably 80 to 120 bar to ensure a homogenization of the propellant with the melt.

Herein, the execution can be carried out in an extruder or an arrangement of one or more extruders. For example, in a first extruder, the components can be melted and blended and a propellant can be injected. In the second extruder, the impregnated melt is homogenized and the temperature and pressure is adjusted. If, for example, three extruders are combined with each other, the mixing of the components as well as the injecting of the propellant can be divided into two different process parts. If, as preferably, only one extruder is used, all process steps, melt, mix, injection of the propellant, homogenization and adjustment of the temperature and or pressure are carried out in an extruder.

The foamed granules may also contain dyes. Here, the addition of dyes can be done by different means.

In one embodiment, the manufactured foamed granules can be dyed after manufacture. Here, the corresponding foamed granules are contacted with a carrier liquid contained with a dye, wherein the carrier fluid has a polarity, which is suitable that a sorption of the carrier fluid is carried out in the foamed granules. The implementation may be carried out in analogy with the methods described in the EP3700969.

Suitable dyes are, for example, inorganic or organic pigments. Suitable natural or synthetic inorganic pigments are, for example, soot, graphite, titanium oxides, iron oxides, zirconia oxides, cobalt oxide compounds, chromium oxide compounds, copper oxide compounds. Suitable organic pigments are, for example, azo-pigments and polycyclic pigments. In a further embodiment, the ink can be added in the preparation of the foamed granules. For example, the dye can be added to the extruder during the preparation of the foamed granules via extrusion.

Alternatively, already dyed material can be used as a starting material for the preparation of the foamed granules, which is extruded or expanded in the closed vessel according to the above-mentioned methods.

Furthermore, in the process described in WO2014/150122, the supercritical liquid or the heated liquid may contain a dye.

The molded parts, in particular the molded body according to the invention have advantageous properties for the above-mentioned applications in the non-pneumatic tire area.

Herein, the tensile and compression properties of the moldings produced from the foamed granules are characterized in that the tensile strength is above 600 kPa (DIN EN ISO 1798, April 2008), the elongation is above 100% (DIN EN ISO 1798, April 2008) and the compressive voltage above 15 kPa is 10% compression (analogous to DIN EN ISO 844, November 2014; the deviation from the standard is in the height of the sample with 20 mm instead of 50 mm and thus the adjustment of the test speed to 2 mm/min).

The rebound elasticity of the moldings produced from the foamed granules is above 55% (analogous to DIN 53512, April 2000; the deviation from the standard is the test specimen height which should be 12 mm, but in this test is carried out with 20 mm in order to avoid a "smashing" of the sample and measuring the substrate).

The density and compression properties of the manufactured moldings are related. Advantageously, the density of the molded parts is between 75 and 375 kg/m3, preferably between 100 to 300 kg/m3, particularly preferably between 150 to 200 kg/m3 (DIN EN ISO 845, October 2009).

The ratio of the density of the molded to the bulk density of the foamed granules according to the invention is generally between 1.5 and 2.5, preferably at 1.8 to 2.0.

Further object of the present invention is a molded body prepared from the foamed granules according to the invention. Therefore, the foamed pellets are preferably fused.

The preparation of the corresponding moldings can be carried out according to the skilled person known methods.

A preferred method for the preparation of a foam molding part includes the following steps:
(A) Inserting the foamed granules according to the invention in a corresponding form,
(B) Fusing of the foamed granules according to the invention from step (A).

The fusion in step (B) is preferably carried out in a closed form, wherein the fusion can be carried out by water vapor, hot air (as e.g. described in EP1979401) or energetic radiation (microwaves or radio waves).

The temperature at the fusion of the foamed granules is preferably below or close to the melting temperature of the polymer from which the particle foam was produced. For the common polymers, therefore, the temperature for fusion of the foamed granules is between 100° C. and 180° C., preferably between 120° C. and 150° C.

Temperature profiles/residence times can be determined individually, e.g. in analogy to the methods described in the US20150337102 or EP2872309.

Fusing by energetic radiation is generally carried out in the frequency range of microwaves or radio waves, if necessary in the presence of water or other polar liquids, such as polar groups having microwave-absorbing hydrocarbons (such as esters of carboxylic acids and diols or triols or glycols and liquid polyethylene glycol) and can be carried out in analogy to the methods described in EP3053732 or WO16146537.

According to the present invention, fusing the foamed pellets is preferably carried out in a mold to shape the molded body obtained. In principle, all suitable methods for fusing foamed pellets can be used according to the present invention, for example fusing at elevated temperatures, such as for example steam chest molding, molding at high frequencies, for example using electromagnetic radiation, processes using a double belt press, or variotherm processes.

The thermoplastic polymer foam from which the molded body is manufactured can be any open-cell or closed-cell polymer foam that can be produced from a thermoplastic. The thermoplastic polymer foam is particularly preferably a molded foam.

The production of the molding made of the polymer foam can be achieved in any desired manner known to the person skilled in the art: by way of example, webs made of a foamed polymer can be produced, and the moldings can be cut out from the webs. If the polymer foam from which the molding has been produced is a molded foam, the molding can be produced by any process known to the person skilled in the art for the production of moldings made of a molded foam: it is possible by way of example to charge pellets made of an expandable thermoplastic polymer to a mold, to expand the pellets to give foam beads by heating, and then to use pressure to bond the hot foam beads to one another. The pressure is generated here via the foaming of the beads, the volume of which increases while the internal volume of the mold remains the same. Uniform heating can be achieved by way of example by passing steam through the mold. However, it is alternatively also possible to charge pre-expanded beads to the mold. In this case, the procedure begins with complete filling of the mold. In a further step, the volume of the mold is reduced by insertion of a ram at the feed aperture, which has likewise been completely filled with expanded beads, and the pressure in the mold is thus increased. The expanded beads are thus pressed against one another and can therefore become fused to give the molding. Here again, the fusion of the beads is in particular achieved via passage of steam through the system.

The injection process used to apply the thermoplastic polymer can by way of example be an injection molding process, a transfer-molding process, or an injection compression-molding process. It is possible on the one hand to insert the molding made of thermoplastic polymer into a mold for the injection molding process, transfer-molding process, or injection compression-molding process, and then to apply the thermoplastic polymer. Alternatively, it is also possible to utilize, for the over molding process, the mold in which the molding made of the polymer foam is also produced. It is usual to use, for this purpose, molds with displaceable core. If the intention is that the thermoplastic polymer be applied only to one side of the molding made of polymer foam, it is alternatively also possible, after the production of the molding made of polymer foam, to remove one mold half, and to seal the second mold half in which the molding is still present by using another mold half into which the thermoplastic polymer for the functional layer is then injected or forced.

For fusing with radiofrequency electromagnetic radiation, the particle foams can preferably be wetted with a polar liquid, which is suitable to absorb the radiation, for example in proportions of 0.1 to 10 wt.-%, preferably in proportions of 1 to 6 wt.-%, based on the used particle foams. Fusing with radiofrequency electromagnetic radiation of the particle foams can be achieved in the context of the present invention even without the use of a polar liquid. The thermal connection of the foam particles takes place, for example, in a form by means of radiofrequency electromagnetic radiation, in particular by means of microwaves. Electromagnetic radiation with frequencies of at least 20 MHz, for example of at least 100 MHz, is understood to be high frequency. As a rule, electromagnetic radiation is used in the frequency range between 20 MHz and 300 GHz, for example between 100 MHz and 300 GHz. Microwaves are preferred in the frequency range between 0.5 and 100 GHz, especially preferably 0.8 to 10 GHz and irradiation times between 0.1 and 15 minutes are used. Preferably, the frequency range of the microwave is adjusted to the absorption behavior of the polar liquid or vice versa the polar liquid is selected based on the absorption behavior according to the frequency range of the used microwave device. Suitable methods are described, for example, in WO2016/146537.

Due to the good mechanical properties and the good temperature behavior, the polymer foams according to the invention are particularly suitable for the preparation of moldings. Molded bodies can be prepared from the foamed granules according to the invention, for example by fusing or gluing.

According to a further aspect, the present invention also relates to the use of a foamed granules of the inventions or a foamed granules, obtained or available according to a method of the invention for the preparation of moldings. According to a further embodiment, the present invention also relates to the use of a foamed granules of the inventions or a foamed granulates, obtained or available according to a method of the invention for the preparation of moldings, wherein the preparation of the molding by means of fusing or gluing of the particles is carried out with each other.

The present invention also relates to a further aspect a hybrid material, containing a matrix of a polymer and a foamed granules according to the present invention. Materials comprise a foamed granulate and a matrix material are referred to in this invention as hybrid materials. The matrix material can be made of a compact material or also of a foam.

Polymers suitable as matrix material are known to the skilled person themselves. Suitable in the context of the present invention are, for example, ethylene-vinyl acetate copolymers, binders based on epoxy or also polyurethanes. According to the invention, polyurethane foams or compact polyurethanes such as thermoplastic polyurethanes are suitable.

According to the invention, the polymer is selected in such a way that a sufficient adhesion is given between the foamed granules and the matrix in order to obtain a mechanically stable hybrid material.

The matrix can surround the foamed granules in whole or in part. According to the invention, the hybrid material may contain further components, for example further fillers or also granules. According to the invention, the hybrid material may also contain mixtures of different polymers. The hybrid material may also contain mixtures of foamed granules.

Foamed granules, which can be used in addition to the foamed granules according to the present invention, are known to the skilled person per se. In particular, foamed granules made of thermoplastic polyurethanes are suitable in the context of the present invention.

According to an embodiment, the present invention accordingly also relates to a hybrid material, containing a matrix of a polymer, a foamed granulate according to the present invention and another foamed granules from a thermoplastic polyurethane.

The matrix comprises in the present invention of a polymer suitable in the context of the present invention as matrix material, for example, elastomers or foams, in particular foams based on polyurethanes, for example elastomers such as ethylene vinyl acetate copolymers or also thermoplastic polyurethanes.

Accordingly, the present invention also relates to a hybrid material as previously described, wherein the polymer is an elastomer. Furthermore, the present invention relates to a hybrid material as previously described, wherein the polymer is selected from the group consisting of ethylene vinyl acetate copolymers and thermoplastic polyurethanes.

According to an embodiment, the present invention also relates to a hybrid material containing a matrix of an ethylene-vinyl acetate copolymer and a foamed granules according to the present invention.

According to a further embodiment, the present invention relates to a hybrid material, containing a matrix of an ethylene-vinyl acetate copolymer, a foamed granulate according to the present invention and another foamed granules, for example from a thermoplastic polyurethane.

According to one embodiment, the present invention relates to a hybrid material containing a matrix of a thermoplastic polyurethane and a foamed granulate according to the present invention.

According to a further embodiment, the present invention relates to a hybrid material, containing a matrix of a thermoplastic polyurethane, a foamed granules according to the present invention and another foamed granules, for example from a thermoplastic polyurethane.

Suitable thermoplastic polyurethanes are known to the skilled person themselves. Suitable thermoplastic polyurethanes are described, for example, in "Plastic Manual, Volume 7, Polyurethanes", Carl Hanser Verlag, 3rd edition 1993, chapter 3.

Preferably, the polymers in the context of the present invention are polyurethanes. Polyurethane in the sense of the invention includes all known elastic polyisocyananate polyaddition products. These include in particular massive polyisocyananate. Polyaddition products, such as viscoelastic gels or thermoplastic polyurethanes, and elastic foams based on polyisocyanate polyaddition products, such as soft foams, semi-hard foams or integral foams. Furthermore, polyurethanes in the sense of the invention elastic polymer blends, containing polyurethane and other polymers, as well as foams from these polymer blends are to be understood. Preferably, the matrix is a hardened, compact polyurethane binder, an elastic polyurethane foam or a viscoelastic gel.

Under a polyurethane binder is understood in the context of the present invention a mixture consisting to at least 50 wt.-%, preferably to at least 80 wt.-% and in particular to at least 95 wt.-% of an isocyanate group having prepolymer, hereinafter referred to as isocyanate prepolymer. Here, the viscosity of the inventive polyurethane binder is preferably in a range of 500 to 4000 mPa·s, particularly preferably from 1000 to 3000 mPa·s, measured at 25° C. according to DIN 53 018.

In the context of the invention, polyurethane foams are understood to be foams in accordance with DIN 7726.

The density of the matrix material is preferably in the range of 1,2 to 0.01 g/cm3. Particularly preferred, the matrix material is an elastic foam or an integral foam with a density in the range of 0.8 to 0.1 g/cm3, in particular from 0.6 to 0.3 g/cm3 or compact material, for example a hardened polyurethane binder.

In particular, foams are suitable as matrix material. Hybrid materials containing a matrix material from a polyurethane foam preferably have a good adhesion between matrix material and foamed granules.

According to an embodiment, the present invention also relates to a hybrid material containing a matrix of a polyurethane foam and a foamed granulate according to the present invention.

According to a further embodiment, the present invention relates to a hybrid material, containing a matrix of a polyurethane foam, a foamed granulate according to the present invention and another foamed granules, for example from a thermoplastic polyurethane.

A hybrid material according to the invention, containing a polymer as a matrix and a foamed granulate according to the invention can be prepared, for example, by the components used for the preparation of the polymer and the foamed granules optionally mixed with further components and converted to the hybrid material, wherein the reaction is preferably under conditions under which the foamed granules is substantially stable.

Appropriate methods and reaction conditions for the preparation of the polymer, in particular an ethylene vinyl acetate copolymer or a polyurethane are known to the skilled person per se.

In a preferred embodiment, the hybrid materials of the invention represent integral foams, in particular integral foams based on polyurethane. Suitable methods for the production of integral foams are known to the skilled person per se. The integral foams are preferably manufactured by the one-shot process with the help of low pressure or high-pressure technology in closed, purpose-controlled molds. The molds are usually made of metal, e.g. aluminium or steel. These methods are described, for example, by Piechota and Röhr in 'Integral Schaumstoff', Carl-Hanser-Verlag, Munich, Vienna, 1975, or in the Plastic Manual, Volume 7, Polyurethanes, 3rd edition, 1993, chapter 7.

If the hybrid material of the invention comprises an integral foam, the amount of the reaction mixture introduced into the mold is dimensioned in such a way that the obtained molds of integral foams have a density of 0.08 to 0.70 g/cm3, in particular from 0.12 to 0.60 g/cm3.

The compaction degrees for the preparation of the moldings with compacted edge zone and cellular core are in the range of 1.1 to 8.5, preferably from 2.1 to 7.0.

Thus, it is possible to produce hybrid materials with a matrix of a polymer and contained therein the foamed granules according to the invention, in which a homogeneous distribution of the foamed particles is present. The foamed granules according to the invention can be easily used in a method for the preparation of a hybrid material, since the individual particles are free-flowing due to their small size and do not place any special requirements on the processing. Techniques for homogeneous distribution of the foamed granules such as slow rotation of the mold can be used.

The reaction mixture for the preparation of the hybrid materials of the invention can optionally also be added aids and/or additives. For example, surface-active substances, foam stabilizers, cell regulators, release agents, fillers, dyes, pigments, hydrolysis protection agents, odour-absorbing substances and fungistatic and bacteriostatic substances are mentioned.

In a hybrid material according to the invention, the volume portion of the foamed granules is preferably 20 percent by volume and more, more preferably 50 percent by volume and more preferably 80 percent by volume and more and in particular 90 percent by volume and more, each based on the volume of the hybrid system according to the invention.

The hybrid materials of the invention, in particular hybrid materials with a matrix of cellular polyurethane, are characterized by a very good adhesion of the matrix material with the foamed granules according to the invention. In this process, a hybrid material according to the invention preferably does not rip at the interface of matrix material and foamed granules. This makes it possible to produce hybrid materials that have improved mechanical properties, such as tear resistance and elasticity, compared to conventional polymer materials, especially conventional polyurethane materials at the same density.

The elasticity of hybrid materials according to the invention in the form of integral foams is preferably greater than 40% and particularly preferably greater than 50% according to DIN 53512.

Furthermore, the hybrid materials according to the invention, in particular those based on integral foams show high rebound elasticities at low density. In particular, integral foams based on hybrid materials according to the invention are therefore excellently suited as materials for shoe soles. This preserves light and comfortable soles with good durability properties. Such materials are particularly suitable as midsoles for sports shoes.

The properties of the hybrid materials of the invention can vary depending on the polymer used in wide ranges and can be varied in particular by a variation of the size, shape and texture of the expanded granules, or the addition of further additives, for example also other non-foamed granules such as plastic granules, for example rubber granules, in wide limits.

The hybrid materials of the invention have a high durability and load-bearing capacity, which is particularly noticeable by a high tensile strength and elongation at break. In addition, hybrid materials of the invention have a low density.

The process of the present invention comprises steps (i) and (ii). The process may comprise further steps such as for example temperature treatments or a treatment of the foamed pellets. According to step (i), the foamed pellets are provided, preferably in a suitable mold, and then fused according to step (ii). Preferably, fusing is carried out by thermal fusing of the foamed pellets. According to a further embodiment, the present invention is directed to the process as disclosed above, wherein step (ii) is carried out by thermal fusing.

According to a further aspect, the present invention is also directed to a molded body obtained or obtainable according to a process as disclosed above.

The molded body according to the present invention can be used for a variety of applications, such as non-pneumatic tires for vehicle wheels such as wheels for cars, bikes, motorcycles, trucks, e-scooter, toys, sport equipment, golf caddy, stroller, wheelchairs.

According to a further aspect, the present invention is directed to a process for the manufacturing of a molded body as insert for non-pneumatic tires comprising the steps of
(i) providing the tube, which comprises the holding pins and which is manufactured by 3D printing or injection molding,
(ii) providing at least one peripheral foam layer,
(iii) composing the elements of step (i) and step (ii).

Preferably the method in step (iii) is selected from the group consisting of steam chest molding, radio frequency (RF) molding, thermal molding, molding with pressure or combinations thereof.

According to a further aspect, the present invention is directed to a use of a molded body for producing non-pneumatic tires.

According to a further aspect, the present invention is directed to a non-pneumatic tire wherein the molded body is surrounded at least partwise by an outer tire and wherein the outer tire and the molded body are fused, glued or pressed together.

The outer tire in particular comprises a rubber material which is selected from the group consisting of thermoplastic elastomers, vulcanizates, cast elastomers, silicone rubber, polytetrafluoroethylene rubber, chloroprene rubber, styrene butadiene rubber (SBR). Preferred are also duroplastic materials. Further preferred are polymers like for example polypropylene, polyethylene terephthalate, polyamides, polyethylene, polyoxymethylene, semi-aromatic polyesters in particular products such as ecovio and ecoflex (BASF SE), polycarbonate.

Either instead of or in addition to the rubber material, which at least partly surrounds the molded body, suitable coats can be applied on the surface of the molded body. Such coatings and coating techniques are known in the state of the art and are for example disclosed in WO2019/105725. Therein coating and lacquering on plastic substrates, for example foam substrates, is described. The content of WO2019/105725 can be applied in the context of the present invention and is included by reference. In the context of the present invention it is also possible that neither a coating nor an outer tire is applied.

According to a further aspect, the present invention is directed to a use of a non-pneumatic tire for vehicle wheels for cars, bikes, motorcycles, trucks, e-scooter, toys, sport equipment, golf caddy, stroller and/or wheelchair.

Illustrative embodiments of the invention are shown in the figures and explained in more detail in the following description.

Figures

BRIEF DESCRIPTION OF THE FIGURES

FIG. 1 Molded body
FIG. 2 Mold for producing a molded body
FIG. 3. Wheel with non-pneumatic tire
FIG. 4. Tube with openings and hollow cavity

DETAILED DESCRIPTION OF THE FIGURES

Figure 1:
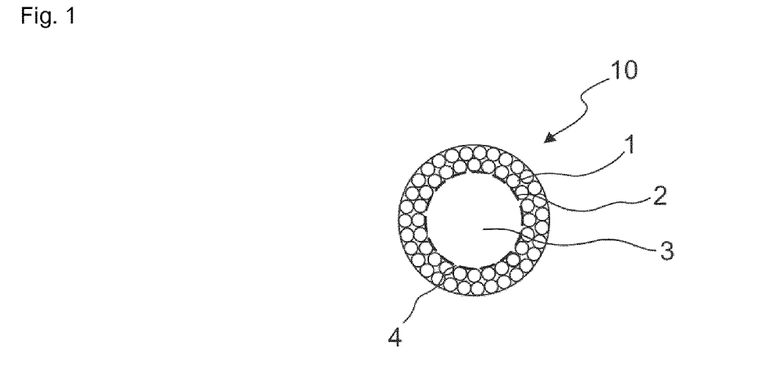

In FIG. 1 a molded body (10) is shown which comprises a peripheral layer (1) of foam granules, which are in particular fused together. The peripheral layer (1) is composed with a tube (2) which comprises openings (4). Furthermore, the inner (hollow) cavity (3) of the tube is shown, therefore the inner tube (2) can also be named a as hollow tube (2). The tube (2) acts as stabilization ring for the molded body (10) and the peripheral foam layer (1). The peripheral foam layer (1) and the hollow tube (2) together form the molded body (10), which preferably is used as insert for non-pneumatic tires. Therefore, the molded body (10) may be surrounded at least partly by an outer tire.

Figure 2:
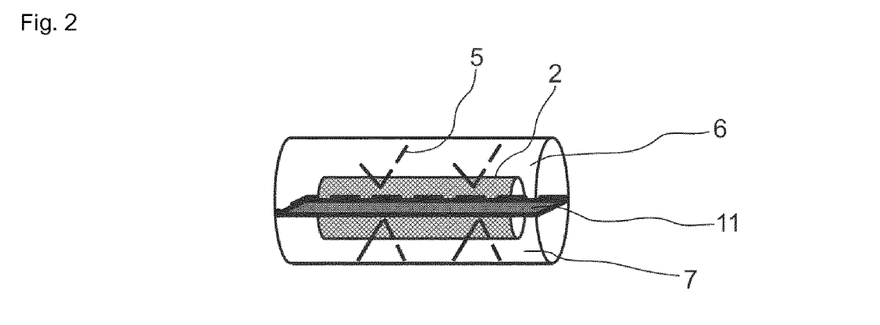

FIG. 2 shows a mold, comprising a top side (6) and a bottom side (7), for forming the molded body comprising the inner hollow tube (2). For the process of the manufacturing of the molded body, the tube in particular comprises holding pins (5) to fix the inner tube (2) within the mold. An alternative could be to use holding pins belonging to the mold to fix the tube. Before the molding process starts and after the inner tube (2) is fixed within the open mold, the particle foam beads, which form the peripheral foam layer, are filled into the mold (not shown). Then the mold is closed (11), by bringing top side (6) and a bottom side (7) together, and the molding process can start. During molding the holding pins (5), depending on the melting point of the material, may melt or will remain and will after molding be surrounded by or part of the peripheral foam layer. During molding the foamed particles of the particle foam fuse together to form the peripheral foam layer. Furthermore, also the tube and the peripheral foam layer are fixed together. As result the molded body is formed.

Figure 3:
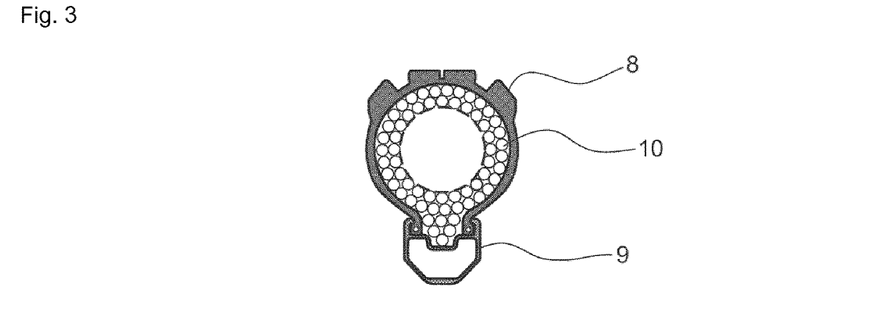

FIG. 3. shows a wheel assembly comprising a rim (9), an outer tire (8) and the molded body (10) according to the present invention. The outer tire (8) and the molded body (10) form together the non-pneumatic tire which is fixed to a rim (9).

Figure 4:
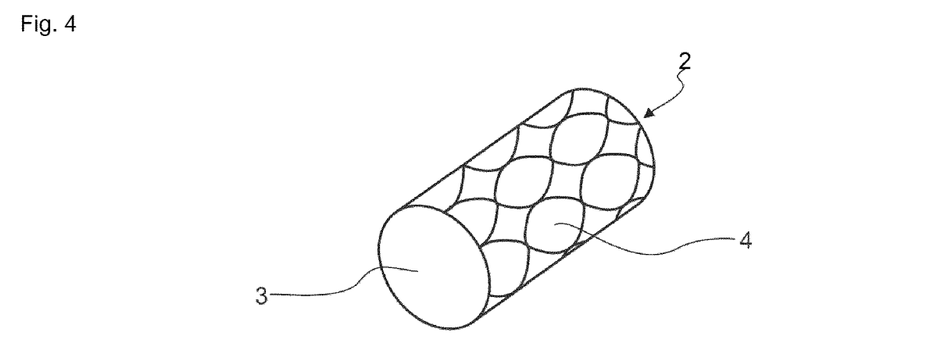

FIG. 4 shows a tube (2). The tube (2) has the cavity (3) and certain openings (4). Due to the cavity (3) and/or openings (4) the heat generation during operation of the non-pneumatic tire is reduced (air circulation and/or isolation). A further function of the tube (2) is stabilizing the peripheral foam layer. Furthermore, the combination of tube (2) and peripheral foam layer enables sufficient hardness of the molded body as insert for non-pneumatic tires while rebound remains to ensure suitable comfort levels. The tube may be rigid for stabilization purpose, but also flexible to enable sufficient rebound.

The invention claimed is:

1. A molded body as an insert for non-pneumatic tires, wherein the molded body comprises the elements of:
(A) a tube, which comprises a hollow cavity, and
(B) at least one peripheral foam layer, which comprises a polymeric foam,
wherein the elements (A) and (B) are composed, and the at least one peripheral foam layer and the tube together form the molded body,
wherein the cavity of the tube comprises rods for stabilizing the tube,
said element (B) is a thermoplastic elastomer selected from the group consisting of thermoplastic polyurethanes (TPU), thermoplastic polyamides (TPA), thermoplastic polyetheresters (TPC), thermoplastic polyesteresters (TPC), thermoplastic vulcanizates (TPV), thermoplastic polyolefins (TPO), thermoplastic styrenic elastomers (TPS), and mixtures thereof, and
said at least one peripheral foam layer comprises foamed granules.

2. The molded body according to claim 1, wherein a material of the tube is selected from the group consisting of thermoplastic elastomers, rubber, cast elastomers, duroplastic materials, polypropylene, polyethylene terephthalate, polyamides, polyethylene, polyoxymethylene, semi-aromatic polyesters, and polycarbonate.

3. The molded body according to claim 1, wherein the tube comprises openings.

4. The molded body according to claim 1, wherein the tube comprises holding pins to fix the tube within a mold.

5. The molded body according to claim 1, wherein the polymeric foam is a foam selected from the group consisting of thermoplastic polymer, thermoplastic elastomer, polyurethane, polyamide, polyolefin, polyethylene, polypropylene, polystyrene, and mixtures thereof.

6. The molded body according to claim 1, wherein the element (A) is a thermoplastic elastomer selected from the group consisting of thermoplastic polyurethanes (TPU), thermoplastic polyamides (TPA), thermoplastic polyetheresters (TPC), thermoplastic polyesteresters (TPC), thermoplastic vulcanizates (TPV), thermoplastic polyolefins (TPO), thermoplastic styrenic elastomers (TPS), and mixtures thereof.

7. The molded body according to claim 1, wherein the at least one peripheral foam layer is a matrix in which the foamed granules are at least partly embedded.

8. A process for manufacturing the molded body as an insert for non-pneumatic tires according to claim 1, the process comprising:
i. providing the tube, which is manufactured by 3D printing or injection molding,
ii. providing the at least one peripheral foam layer, and
iii. composing the elements of (i) and (ii), wherein the tube comprises holding pins to fix the tube and the at least one peripheral foam layer together within a mold.

9. The process according to claim 8, wherein a method in (iii) is selected from the group consisting of steam chest molding, radio frequency (RF) molding, thermal molding, molding with pressure, and combinations thereof.

10. A molded body, obtained by the process according to claim 8.

11. A non-pneumatic tire, comprising:
the molded body according to claim 1, wherein the molded body is surrounded at least partwise by an outer tire, and wherein the outer tire and the molded body are fused, glued or pressed together.

* * * * *